United States Patent
Park et al.

(10) Patent No.: US 9,600,887 B2
(45) Date of Patent: Mar. 21, 2017

(54) TECHNIQUES FOR DISPARITY ESTIMATION USING CAMERA ARRAYS FOR HIGH DYNAMIC RANGE IMAGING

(71) Applicant: Intel Corporation, Santa Clara, CA (US)

(72) Inventors: Sung Hee Park, Stanford, CA (US); Kalpana Seshadrinathan, Santa Cara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 495 days.

(21) Appl. No.: 14/101,061

(22) Filed: Dec. 9, 2013

(65) Prior Publication Data

US 2015/0161797 A1 Jun. 11, 2015

(51) Int. Cl.
  *G06K 9/00* (2006.01)
  *G06T 7/00* (2006.01)
  (Continued)

(52) U.S. Cl.
  CPC ............ *G06T 7/0075* (2013.01); *G06T 5/007* (2013.01); *G06T 5/009* (2013.01); *G06T 5/50* (2013.01); *G06T 7/0065* (2013.01); *H04N 5/2355* (2013.01); *H04N 13/0022* (2013.01); *H04N 13/0242* (2013.01); *H04N 13/0271* (2013.01);
  (Continued)

(58) Field of Classification Search
  CPC ..... G06T 5/009; G06T 7/0075; G06T 7/0065; G06T 5/50; G06T 5/007; G06T 2207/10012; G06T 2207/20228; G06T 2207/20208; G06T 2207/20216; G06T 2200/04; H04N 13/0242; H04N 13/0022; H04N 5/2355; H04N 13/0271
  See application file for complete search history.

(56) References Cited

U.S. PATENT DOCUMENTS

| 2008/0199054 A1* | 8/2008 | Matey ............... G06K 9/00604 382/117 |
| 2010/0271512 A1* | 10/2010 | Garten ..................... G09G 5/06 348/239 |
| 2012/0162379 A1* | 6/2012 | Dahi .................. H04N 5/23254 348/47 |

OTHER PUBLICATIONS

Debevec et al., "Recovering High Dynamic Range Radiance Maps from Photographs", Computer Science Division, University of California at Berkley, (1997), 10 pages.
(Continued)

*Primary Examiner* — Chan Park
*Assistant Examiner* — Elisa Rice

(57) ABSTRACT

Techniques for improved focusing of camera arrays are described. In one embodiment, a system may include a processor circuit, a camera array, and an imaging management module for execution on the processor circuit to capture an array of images from the camera array, the array of images comprising first and second images taken with first and second values of an exposure parameter, respectively, the first value different than the second value, to estimate a noise level, to normalize an intensity of each image based upon the noise level of the respective image, to produce a respective normalized image, to identify candidate disparities in each of the respective normalized images, to estimate a high dynamic range (HDR) image patch for each candidate disparity, and to compute an error from the HDR image patch and an objective function, to produce a disparity estimate. Other embodiments are described and claimed.

30 Claims, 9 Drawing Sheets

(51) Int. Cl.
  *G06T 5/00* (2006.01)
  *G06T 5/50* (2006.01)
  *H04N 5/235* (2006.01)
  *H04N 13/00* (2006.01)
  *H04N 13/02* (2006.01)

(52) U.S. Cl.
  CPC  *G06T 2200/04* (2013.01); *G06T 2207/10012* (2013.01); *G06T 2207/20208* (2013.01); *G06T 2207/20216* (2013.01); *G06T 2207/20228* (2013.01)

(56) References Cited

OTHER PUBLICATIONS

Dhond et al., "Structure from Stereo—A Review", IEEE Transactions on Systems, Man and Cybernetics, vol. 19, No. 6, Nov./Dec. 1989, pp. 1489-1510.
Granados et al.,"Optimal HDR Reconstruction with Linear Digital Cameras", (2010), 8 pages.
Hasinoff et al.,"Noise-Optimal Capture for High Dynamic Range Photography", Massachusetts Institute of Technology Computer Science and Artificial Intelligence Laboratory, (2010), 8 pages.
Seshadrinathan et al., "Noise and Dynamic Range Optimal Computational Imaging", presented at IEEE International Conference on Image Processing, (2012), 4 pages.
Healey et al., "Radiometric CCD Camera Calibration and Noise Estimation", IEEE Transactions on Pattern Analysis and Machine Intelligence, vol. 16, No. 3, Mar. 1994, pp. 267-276.
Okutomi et al., "A Multiple Baseline Stereo", IEEE Transactions on Pattern Analysis and Machine Intelligence, vol. 15, No. 4, Apr. 1993, pp. 353-363.
Troccoli et al., "Multi-view multi-exposure stereo", IEEE Proceedings of the Third International Symposium on 3D Data Processing, Visualization, and Transmission (2006), 8 pages.
Extended European Search Report received for European Patent Application No. 14191567.8, mailed Mar. 19, 2015, 12 pages.
Kronander et al., "Unified HDR reconstruction from raw CFA data", Computational Photography (ICCP), IEEE, Apr. 19, 2013, 9 pages.
Wilburn, Bennett, "High Performance Imaging Using Arrays of Inexpensive Cameras", <http://graphics.stanford.edu/~wilburn/wilburn_thesis.pdf>, Dec. 31, 2004, 128 pages.
Katartzis et al., "Robust Bayesian Estimation and Normalized Convolution for Super-resolution Image Reconstruction", IEEE Conference on Computer Vision and Pattern Recognition, Jun. 18-23, 2007, 7 pages.
Sun et al., "HDR Image Construction from Multi-exposed Stereo LDR Images", International Conference on Image Processing, Sep. 26, 2010, 4 pages.
Wetzstein, et al., "Computational Plenoptic Imaging", Computer Graphics Forum, vol. 30, No. 8, Dec. 1, 2011, pp. 1-13.
Wetzstein, et al., "Computational Plenoptic Imaging", Computer Graphics Forum, vol. 30, No. 8, Dec. 1, 2011, pp. 14-30.
Wilburn et al., "High Performance Imaging Using Large Camera Array" ACM Transactions on Graphics, ACM, vol. 24, No. 3, Jul. 1, 2005, 12 pages.
Mitsunaga et al., "Radiometric Self Calibration", 1999 IEEE Computer Society Conference on Computer Vision and Pattern Recognition, Jun. 23-25, 1999, 7 pages.

\* cited by examiner

600

TECHNIQUES FOR DISPARITY ESTIMATION USING CAMERA ARRAYS FOR HIGH DYNAMIC RANGE IMAGING

BACKGROUND

In the field of image acquisition and processing, it may be desirable to generate a composite image based on a set of images captured by a two-dimensional camera array. Generating such a composite image may involve combining some or all of the captured images. Often, a user of a camera array may desire that in such a composite image, a region corresponding to a particular visual feature—such as a face, for example—be within dynamic range. Focusing a particular composite image may involve transforming some or all of the captured images based in part on the depth of that visual feature with respect to the camera array. Under some circumstances, the depth of such a visual feature may not be known, and it may be undesirable to require that a user manually determine and input that depth. As such, techniques for focusing a region of a composite image without requiring knowledge of the focus depth may be desirable.

DETAILED DESCRIPTION

Various embodiments may be generally directed to techniques for improved composite dynamic range of camera arrays. In one embodiment, for example, an apparatus may comprise a processor circuit and an imaging management module, and the imaging management module may be operable by the processor circuit to determine, for each of a plurality of candidate displacement factors for an image array comprising a plurality of images, a corresponding sharpness, determine an optimal displacement factor comprising a candidate displacement factor corresponding to a maximized sharpness, and transform the image array based on the optimal displacement factor. In this manner, a composite image may be generated in which one or more particular desired regions of an HDR image are within dynamic range, e.g., not undersaturated or oversaturated. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
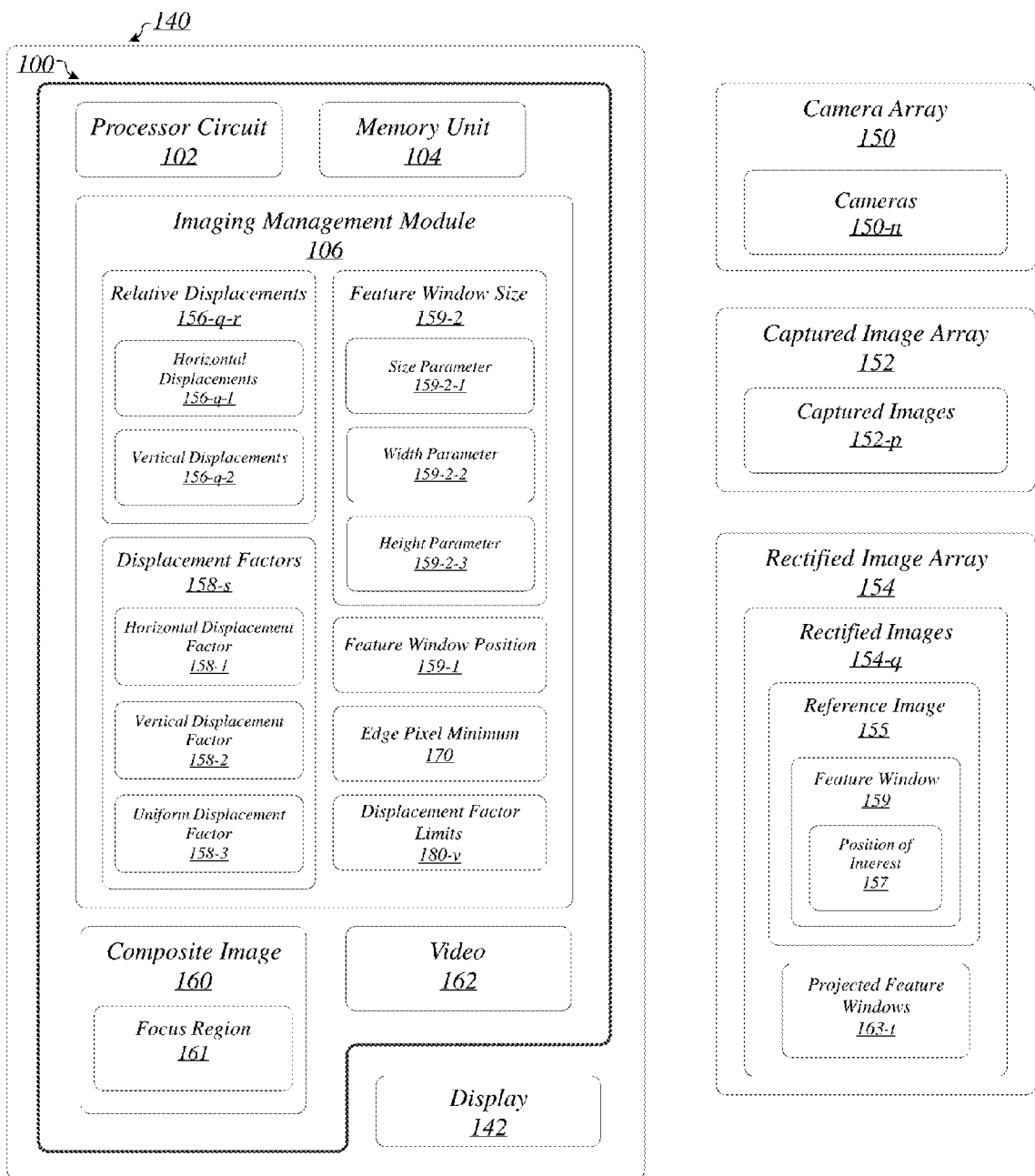
FIG. 1 illustrates one embodiment of an apparatus and one embodiment of a first system.

FIG. 1 illustrates a block diagram of an apparatus 100. As shown in FIG. 1, apparatus 100 comprises multiple elements including a processor circuit 102, a memory unit 104, and an imaging management module 106. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. Although memory unit 104 is comprised within apparatus 100 in FIG. 1, memory unit 104 may be external to apparatus 100 in some embodiments. The embodiments are not limited in this context.

In various embodiments, apparatus 100 may comprise an imaging management module 106. Imaging management module 106 may comprise logic, algorithms, and/or instructions operative to capture, process, edit, compress, store, print, and/or display one or more images. In some embodiments, imaging management module 106 may comprise programming routines, functions, and/or processes implemented as software within an imaging application or operating system. In various other embodiments, imaging management module 106 may be implemented as a standalone chip or integrated circuit, or as circuitry comprised within processor circuit 102 or within a graphics chip or other integrated circuit or chip. The embodiments are not limited in this respect.

FIG. 1 also illustrates a block diagram of a system 140. System 140 may comprise any of the aforementioned elements of apparatus 100. System 140 may further comprise a display 142. Display 142 may comprise any display device capable of displaying information received from processor circuit 102. Examples for display 142 may include a television, a monitor, a projector, and a computer screen. In one embodiment, for example, display 142 may be implemented by a liquid crystal display (LCD), light emitting diode (LED) or other type of suitable visual interface. Display 142 may comprise, for example, a touch-sensitive color display screen. In various implementations, display 142 may comprise one or more thin-film transistors (TFT) LCD including embedded transistors. In various embodiments, display 142 may be arranged to display a graphical user interface operable to directly or indirectly control imaging management module 106. For example, in some embodiments, display 142 may be arranged to display a graphical user interface generated by an imaging application implementing imaging management module 106. In such embodiments, the graphical user interface may enable operation of imaging management module 106 to capture, process, edit, compress, store, print, and/or display one or more images. The embodiments, however, are not limited to these examples.

In some embodiments, apparatus 100 and/or system 140 may be configurable to communicatively couple with a camera array 150. Camera array 150 may comprise a plurality of cameras 150-n. It is worthy of note that "n" and similar designators as used herein are intended to be variables representing any positive integer. Thus, for example, if an implementation sets a value for n=4, then a complete set of cameras 150-n may include cameras 150-1, 150-2, 150-3, and 150-4. It is worthy of note that although camera array 150 is illustrated as being external to apparatus 100 and system 140 in FIG. 1, in some embodiments, camera array 150 may be comprised within apparatus 100 and/or system 140. The embodiments are not limited in this context.

An array of multiple cameras may acquire a three-dimensional ("3D") scene from different camera positions arranged in a known configuration. For example, a plurality of N cameras may be arranged as one row of N elements, where N is a positive integer. In other embodiments, a plurality of M cameras may be arranged as one column of M elements, where M is a positive integer. In other embodiments, a plurality of M×N cameras may be arranged as a two-dimensional array of M rows and N columns.

In some embodiments, a full M×N array may be simulated by moving a subarray in a tiling pattern and capturing images with each move. The subarray may be a rectangular, triangular, hexagonal etc. shape that tiles the full M×N array. For example, an M×N array may be simulated by moving an M×1 column N times, or by moving a 1×N row M times, or by moving a single camera M×N times. For such embodiments, the scene to be photographed should be substantially static during the time needed to take a full set of M×N images.

In various embodiments, camera array 150 may comprise a two-dimensional (2D) camera array. A 2D camera array may comprise a camera array in which the optical centers of the cameras therein are situated in—or approximately situated in—a common plane in three-dimensional space, and arranged in—or approximately arranged in—multiple rows and columns within their common plane. It is worthy of note that because the optical centers of the cameras within a 2D camera array may be situated approximately on—but not necessarily precisely on—the common plane, the actual arrangement of optical centers in a particular 2D camera array may be three-dimensional. The embodiments are not limited in this context.

Figure 2A:
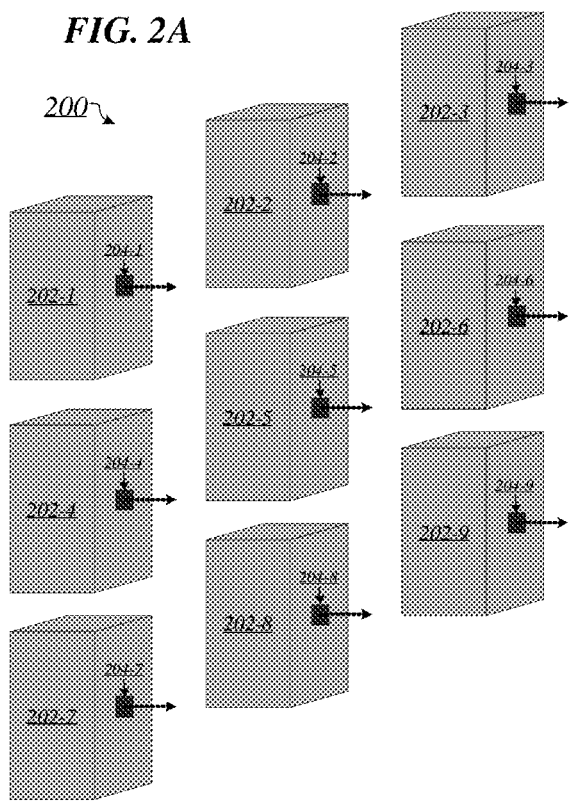
FIG. 2A illustrates one embodiment of a first camera array.

An example of a camera array 200 is illustrated in FIG. 2A. As shown in FIG. 2A, camera array 200 comprises nine cameras, labeled 202-1 to 202-9, oriented as illustrated by the dashed arrows included therein. Each camera 202-n in camera array 200 comprises a respective optical center 204-n. For example, camera 202-1 comprises an optical center 204-1. The embodiments are not limited to this example.

Figure 2B:
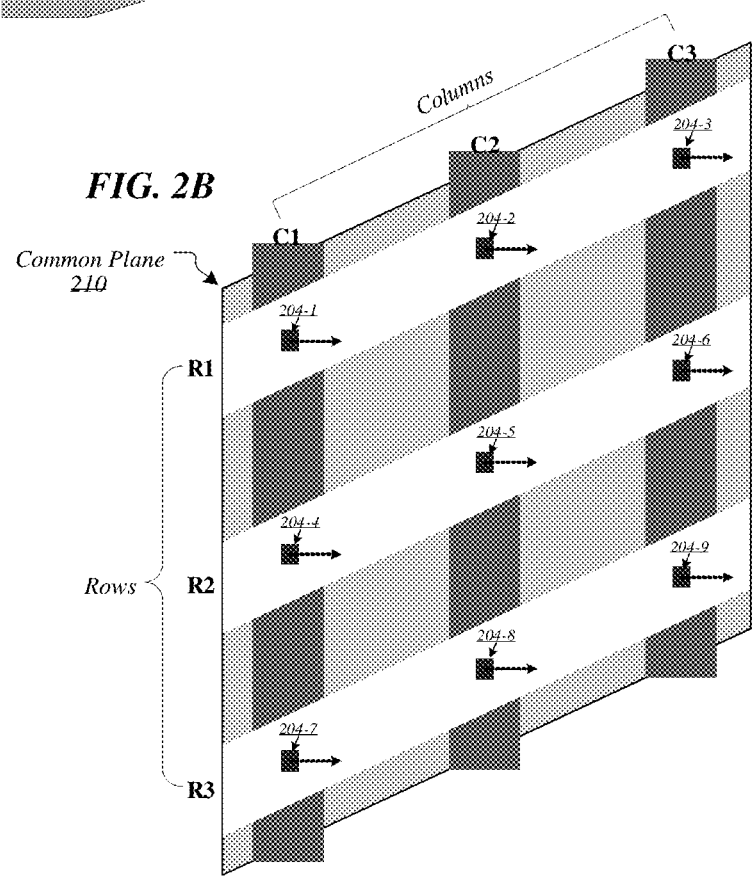
FIG. 2B illustrates a second embodiment of the first camera array.
Figure 3A:
FIGS. 3A-3E together illustrate one embodiment of a captured image array
Figure 3B:
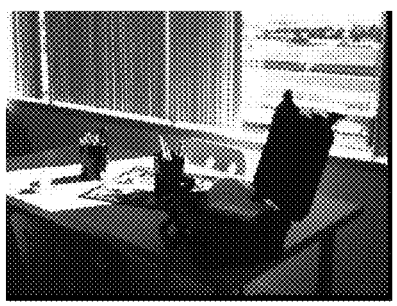
Figure 3C:
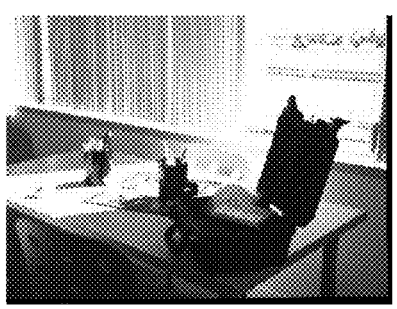
Figure 3D:
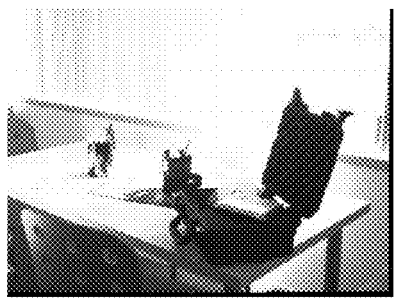
Figure 3E:
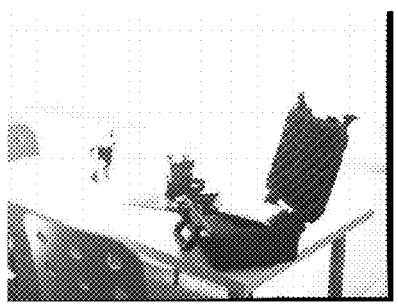

FIG. 2B demonstrates that camera array 200 of FIG. 2A may comprise a 2D camera array. Included in FIG. 2B are the optical centers 204-n of the cameras 202-n in camera array 200 of FIG. 2A. As shown in FIG. 2B, these optical centers 204-n are situated in—or approximately in—a common plane 210, and reside—or approximately reside—in respective rows R1, R2, and R3 and columns C1, C2, and C3 within common plane 210. For example, optical centers 204-1, 204-4, and 204-7 all reside or approximately reside in column C1, and optical centers 204-7, 204-8, and 204-9 all reside or approximately reside in row R3. The embodiments are not limited to these examples. It is worthy of note that although nine cameras 202-n arranged in three rows and three columns are featured in the example 2D camera array of FIGS. 2A and 2B, 2D camera arrays comprising lesser or greater numbers of cameras and corresponding optical centers, rows, and columns are both possible and contemplated, and the embodiments are not limited in this context.

An important application of camera arrays is in computation of a composite image having an improved combination of dynamic range and resolution for a scene. The improved combination is useful for perceiving or resolving image detail throughout an image that has a high dynamic range. Computation of the improved combination of dynamic range and resolution begins by identifying and estimating a disparity between corresponding pixels in the images from the camera array. Disparity between a pair of images of a scene is known as a difference between corresponding points of the scene in the pair of images. A calculation of disparity may be extended to include more than one pair of images.

Conventional methods assume that all cameras in an array image a scene using the same values for exposure parameters, e.g., values for f-stop, shutter speed, and/or gain. However, the entire scene may include areas that are very bright and other areas that are very dark. This produces a high dynamic range ("HDR") over the entire scene. For example, an indoor scene in front of and backlit by a sunlit window produces an HDR image. Conventional sensor arrays are unable to capture the entire dynamic range of the scene simultaneously with a sufficiently small intensity resolution to resolve slight intensity differences within bright areas or dark areas. Consequently, bright areas appear to be washed out, and/or darker areas simply look black.

Embodiments in accordance with the present disclosure address the problem of providing sufficient resolution over an HDR scene by use of an array of cameras. Different cameras within the array may use different values of exposure parameters tailored to capturing different portions of the scene. Some cameras may have settings tailored to bright areas of the scene, and other cameras may have settings tailored to dark areas of the scene. Images from these multiple cameras may be combined using estimated disparities to produce an image that has a higher dynamic range than that of a single image from any one of the cameras in the camera array.

Traditional disparity estimation techniques include a multiple-baseline stereo ("MBS") process that utilizes sum-of-squared differences ("SSD") or sum-of-absolute-differences ("SAD") between image patches. However, such processes do not perform well when the cameras use different values of exposure parameters. This is because the different values of exposure parameters used by the different cameras in the array result in regions of under- and over-saturation in some images and varying degrees of noise in the images. Saturation further causes problems when the image from the reference camera used in computing SSD suffers from saturation. Multi-exposure stereo using images of a static scene with unknown exposure times/gains are known, in which an iterative technique to estimate disparity is used. Saturation may be addressed by running a disparity estimation process several times using a different image as the reference. However, such a process is computationally expensive.

Embodiments in accordance with the present disclosure provide a process to estimate disparity from a camera array, in which the values of exposure parameters for different cameras in the array are not necessarily identical. Embodiments of the process account for both saturation and noise variations. Embodiments assume time synchronous capture of any scene using a camera array, such that the values of exposure parameters are known. Embodiments have an advantage of being computationally efficient because the process is not iterative.

Some embodiments may use image rectification in order to simplify the determination of inter-image pixel location correspondences. Image rectification involves transforming one or more images such that for a particular pixel in a rectified first image captured by a first camera, a search for a corresponding pixel in a corresponding rectified second image captured by a second camera may be confined to a same pixel row or same pixel column of the rectified second image as that in which it appears in the rectified first image. A set of rectified images from camera array 150 of known geometry are denoted using $\{x(k), k<=N\}$, where $x(k)$ represents the image from camera 150-$k$. Corresponding exposure parameter values are assumed to be known, and not all identical among the N cameras. Embodiments provide a non-iterative and computationally efficient way to estimate disparity from these images having varying exposures.

Figure 4A:
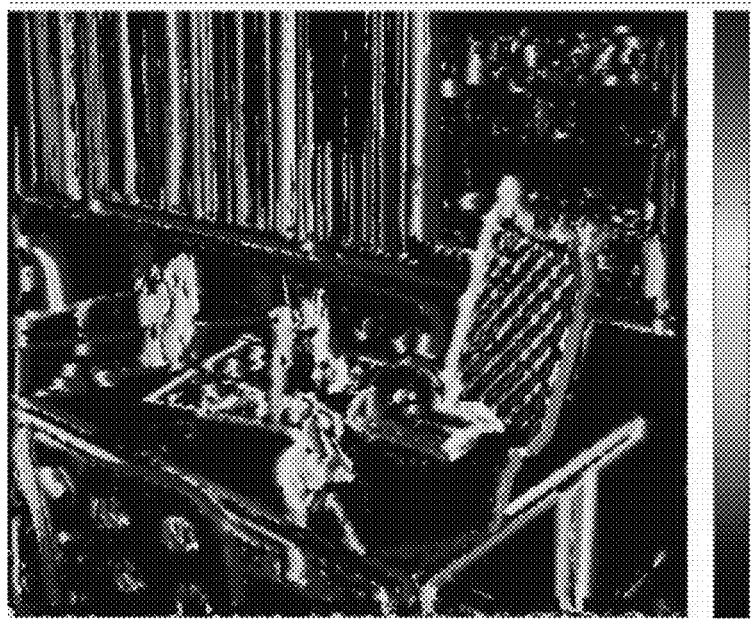
FIG. 4A illustrates a disparity map.
Figure 4A:
Figure 4B:
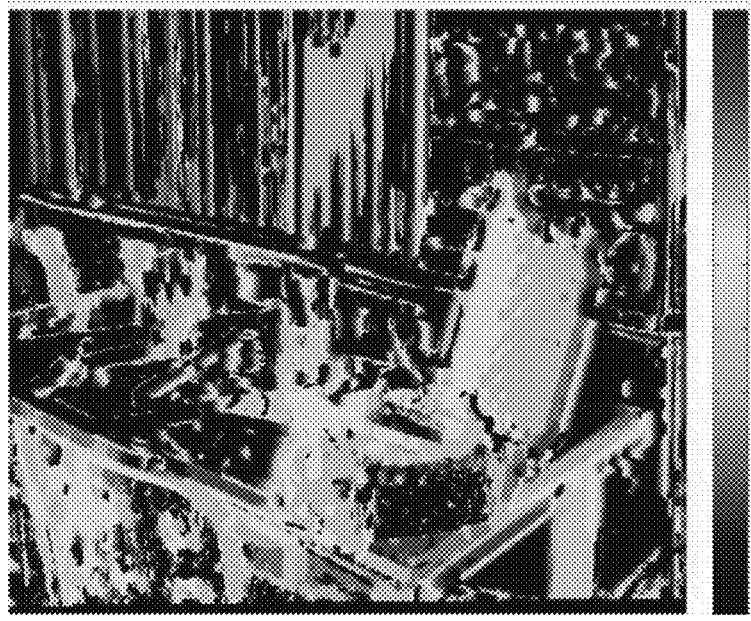
FIG. 4B illustrates one embodiment of a disparity map.
Figure 4B:

In some embodiments, camera array 150 may comprise one row of five cameras, producing five images captured with varying values of exposure parameters. The input images are shown in FIGS. 3A-3E and an estimated disparity calculated in two ways is shown in FIGS. 4A-4B. Embodiments described herein may produce a disparity map that is denser matches than the known art.

Returning to FIG. 1, in operation, a camera array 150 such as the 2D camera array 200 illustrated in FIGS. 2A and 2B may capture a plurality of captured images 152-$p$, which may be regarded as comprising a captured image array 152. A captured image array 152 comprising captured images 152-$p$ captured by a 2D camera array 150 may comprise a two-dimensional captured image array. In some embodiments, captured image array 152 may comprise a number of captured images 152-$p$ that is equal to the number of cameras 150-$n$ in the camera array 150, and each of the captured images 152-$p$ may comprise an image captured by a corresponding one of the cameras 150-$n$. The embodiments are not limited in this context.

FIGS. 3A-3E illustrate at least a portion of a set of images captured from a camera array, in particular a camera array that is configured as a 5×1 array, e.g., one row or one column of five camera elements. Progressing from FIG. 3A to FIG. 3E, each successive image has been captured using an exposure time that increases by a factor of 2 (i.e., one f-stop) with each image. Dark areas that are not discernable in FIG. 3A (e.g., the lid of the shipping case) are plainly discernable in FIG. 3E. Conversely, bright areas that are not discernable in FIG. 3E (e.g., outside the window) are plainly discernable in FIG. 3A. The captured images of FIGS. 3A-3E correspond to captured images 152-$p$ of FIG. 1. The embodiments are not limited to this example.

Returning to FIG. 1, in various embodiments, it may be desirable to combine information comprised within captured images such as captured images 152-$p$ (e.g., FIGS. 3A-3E) to generate a composite image 160 based on those captured images. For example, it may be desirable to generate a composite image 160 having enhanced, improved, and/or desired characteristics relative to those of any or all of the captured images 152-$p$ in a captured image array 152, by combining information comprised within those captured images 152-$p$. In some embodiments, generating a composite image 160 based on the captured images 152-$p$ may comprise determining corresponding positions of the various captured images 152-$p$, determining descriptive properties of those positions, and computing descriptive properties of positions in the composite image based on the descriptive properties of the corresponding positions in the captured images 152-$p$. With respect to any two particular images, a position within a first image and a position within a second image may be said to correspond to each other when the two positions comprise visual information describing the same—or approximately the same—point in three-dimensional space, such as a point on an object, feature, surface, person, landscape, or other physical entity or visual effect captured by a camera array 150. For example, with respect to captured images of FIGS. 3A-3E, positions of a lid corner in each image are deemed to correspond to each other, since each describes the same point in its respective captured image of FIGS. 3A-3E. The embodiments are not limited to this example.

In various embodiments, determining corresponding positions in the captured images 152-$p$ of a captured image array 152 may comprise searching within those captured images 152-$p$ according to one or more matching algorithms. In some cases, searching for corresponding positions within a set of captured images 152-$p$ may be computationally intensive, because for each position in a particular captured image 152-$p$, a search may be required over both a horizontal and vertical range of positions in the other captured images 152-$p$ in order to locate corresponding positions. This may be the case when corresponding positions in the captured images 152-$p$ are not aligned. For example, a search for corresponding positions 302-$p$ within captured images 352-$p$ of FIG. 3A may be computationally intensive, because those corresponding positions 302-$p$ are neither horizontally or vertically aligned. More particularly, for example, positions 302-2, 302-5, and 302-8 reside at varying horizontal coordinates within their respective captured images 352-$p$, despite the fact that their respective captured images 352-$p$ reside in the same column, C2, within captured image array 300. The embodiments are not limited to this example.

Returning to FIG. 1, in order to reduce the computational costs associated with searching for corresponding positions within a set of captured images 152-$p$, apparatus 100 and/or system 140, and/or one or more elements external to apparatus 100 and/or system 140 may be operative to perform image rectification on captured image array 152 to obtain a rectified image array 154 comprising rectified images 154-$q$. Image rectification involves transforming one or more images such that for a particular pixel in a rectified first image captured by a first camera, a search for a corresponding pixel in a corresponding rectified second image captured by a second camera may be confined to a same pixel row or same pixel column of the rectified second image as that in which it appears in the rectified first image. Rectified images 154-$q$ may be generated such that corresponding positions of rectified images 154-$q$ sharing a common row within a rectified image array 154 share a common horizontal coordinate within their respective rectified images 154-$q$, and corresponding positions of rectified images 154-$q$ sharing a common column within the rectified image array 154 share a common vertical coordinate within their respective rectified images 154-$q$. In some embodiments, performing image rectification on a captured image array such as captured image array 152 to obtain a rectified image array such as rectified image array 154 may comprise identifying a common plane for the underlying camera array 150, defining a composite orientation for the camera array 150 based on the common plane, and rotationally transforming the captured images 152-$p$ in the captured image array 152 based on the deviations of their capturing cameras' orientations from that of the camera array 150, the locations of their capturing cameras within the common plane, and/or the intrinsic parameters of their capturing cameras. In various embodiments, apparatus 100 and/or system 140, and/or one or more elements external to apparatus 100 and/or system 140, may be operative to generate a composite image 160 based on a captured image array 152 by generating a rectified image array 154 based on the captured image array 152 and then generating the composite image array 160 based on the rectified image array 154. The embodiments are not limited in this context.

Returning to FIG. 1, as noted above, with respect to a captured image array 152, it may be desirable to generate a composite image 160 having enhanced, improved, and/or desired characteristics relative to those of any or all of the captured images 152-$p$ in the captured image array 152 and/or the rectified images 154-$q$ in the rectified image array 154. In some embodiments, for example, it may be desirable to generate a composite image 160 in which a particular HDR region 161 is within dynamic range. In various embodiments, such an HDR region 161 may correspond to one or more positions of interest in one or more captured images 152-$p$ and/or rectified images 154-$q$, which in turn may correspond to one or more objects, features, surfaces, persons, or other physical entities. An object, feature, surface, person, or other physical entity to which a position of interest corresponds may be referred to as a primary feature. In some such embodiments, a particular captured image 152-$p$ or rectified image 154-$q$ may comprise a reference image 155, a position of interest 157 may be selected within that reference image 155, and it may be desirable to generate a composite image 160 in which an HDR region 161 containing a primary feature corresponding to that position of interest 157 in the reference image 155 is within dynamic range. For instance, with respect to captured image array 300 of FIG. 3A, captured image 352-5 may comprise a reference image 155 and a position 305 may be selected as a position of interest 157. As such, it may be desirable to generate a composite image 160 in which an HDR region 161 containing the undersaturated or oversaturated areas are within dynamic range. The embodiments are not limited to this example.

In various embodiments, in order to generate a composite image 160 in which an HDR region 161 corresponding to a particular position of interest is within dynamic range, imaging management module 106 may be operative to transform rectified image array 154 according to an HDR depth corresponding to an associated depth of the position of interest with respect to the camera array 150.

FIG. 4A comprises a disparity map using a multiple-baseline stereo ("MBS") process as known in the art. FIG. 4B comprises a disparity map according to an embodiment. FIG. 4A and FIG. 4B represent the disparity and the vertical scale shows the disparities in pixels. Regions corresponding to larger disparities correspond to objects in the scene that are closer to the camera. Black pixels correspond to regions where disparity estimates are unreliable. FIG. 4B has fewer black pixels and the disparity is more accurate in parts of the drapes, the lid of the open case, the chair, and so forth.

Figure 5:
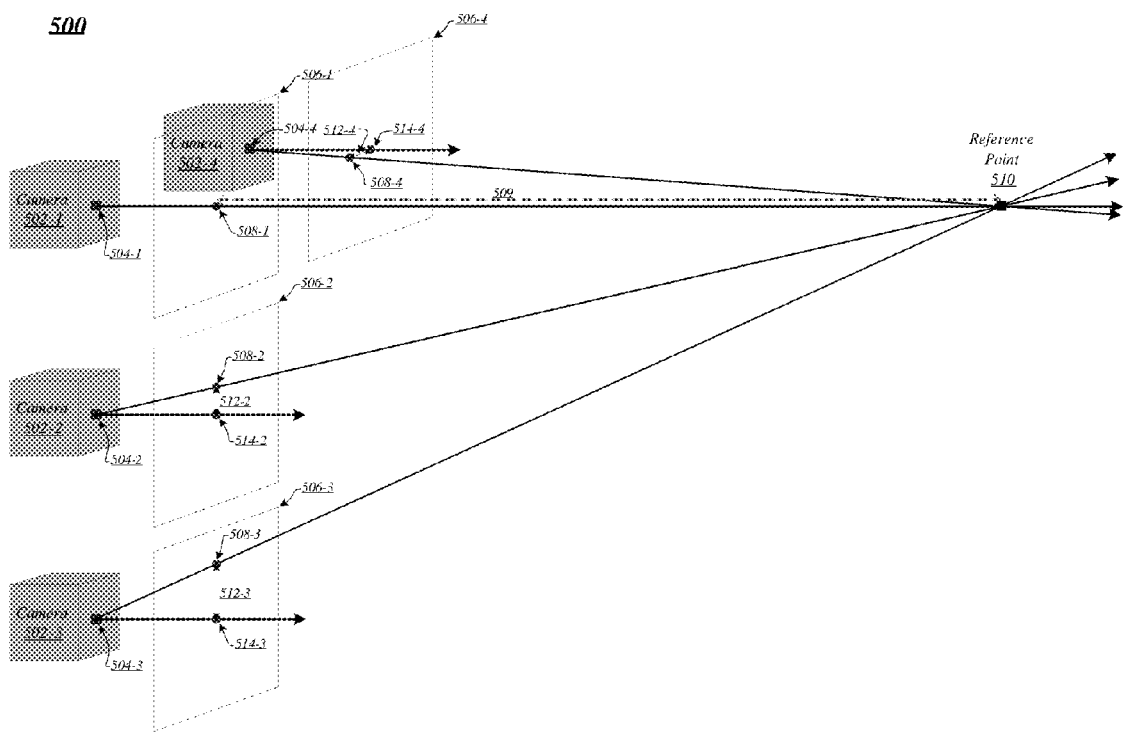
FIG. 5 illustrates one embodiment of a second camera array.

FIG. 5 comprises an example embodiment of a camera array 500 in which capturing a scene with an array of cameras that are not all operating with the same values of exposure parameters is illustrated. As shown in FIG. 5, camera array 500 comprises cameras 502-1, 502-2, 502-3, and 502-4. Each camera 502-$n$ comprises a respective optical center 504-$n$ and image plane 506-$n$. Although only these four cameras 502-$n$ are illustrated in FIG. 5, a camera array such as camera array 500 may comprise additional cameras 502-$n$, and the embodiments are not limited in this context. A focus depth 509 comprises a distance between camera array 500, defined with respect to optical center 508-1 of camera 502-1, and a reference point 510. The lines connecting the reference point 510 to the optical centers 504-$n$ of cameras 502-$n$ intersect the image planes 506-$n$ at respective positions 508-$n$. As such, positions 508-1, 508-2, 508-3, and 508-4 may be said to correspond to each other. In this example, camera 502-1 is selected as a reference camera, and position 508-1 in the image plane 506-1 of camera 502-1 is selected as a reference position. In the image plane 506-$n$ of each other camera 502-$n$, a gap 512-$n$ exists between the position 508-$n$ and a position 514-$n$ that resides at the same coordinates within the image plane 506-$n$ as does reference position 508-1 within image plane 506-1. For example, in image plane 506-3, a gap 512-3 separates position 508-3—which corresponds to reference position 508-1 in image plane 506-1—from position 514-3, which resides at the same coordinates within image plane 506-3 as does reference position 508-1 within image plane 506-1.

Returning to FIG. 1, as noted above, in various embodiments, it may be desirable to generate a composite image 160 in which an HDR region 161 containing a primary feature corresponding to a position of interest is within dynamic range, and imaging management module 106 may be operative to transform rectified image array 154 according to an HDR range corresponding to the primary feature.

However, in some embodiments, the associated depth of the primary feature may be unknown, and/or it may be undesirable to require that the associated depth of the primary feature be determined and/or input into apparatus 100 and/or system 140. For example, a user of a camera array 150 may wish to focus on a primary feature comprising an object, but may have no way of knowing or measuring the associated depth of that object with respect to the camera array 150.

In various embodiments, apparatus 100 and/or system 140 may be operative to generate a composite image 160 in which an HDR region 161 containing a primary feature identified by a specified position of interest 157 in a reference image 155 is within dynamic range without requiring that the associated depth of the primary feature be directly determined. More particularly, in some embodiments, instead of requiring a direct determination of the associated depth of the primary feature identified by a specified position of interest, imaging management module 106 may evaluate various candidate values of horizontal displacement factor 158-1, vertical displacement factor 158-2, and/or uniform displacement factor 158-3 based on a level of sharpness that they produce in the focus region 161 in the composite image 160 that contains the primary feature. Although these various candidate values may correspond to various associated depths, actual calculation of those associated depths may not be required.

In general operation, apparatus 100 and/or system 140 may be operative to receive a captured image array 152 captured by camera array 150-$n$, and/or may be operative to generate a rectified image array 154 based on such a captured image array 154, or to receive a rectified image array 154 generated by one or more external elements based on such a captured image array 152. In various embodiments, apparatus 100 and/or system 140 may be operative to send an instruction to camera array 150 to capture the images 152-$p$ in the captured image array 152, and may receive the captured image array 152 in response to the instruction. The embodiments are not limited in this context.

In some embodiments, imaging management module 106 may be operative to identify and/or define a particular captured image 152-$p$ within captured image array 152 and/or a particular rectified image 154-$q$ within rectified image array 154 as a reference image 155. Although reference image 155 comprises a captured image 152-$p$ in captured image array 152 in the example of FIG. 1, reference image 155 may comprise a rectified image 154-$q$ in various embodiments. In some embodiments, a particular camera 150-$n$ may be defined as a reference camera, such that each time a captured image array 152 and/or a rectified image array 154 is received, the captured image 152-$p$ and/or rectified image 154-$q$ corresponding to that camera 150-$n$ will be defined as the reference image 155. In various other embodiments, the reference image 155 may comprise neither a captured image 152-$p$ or a rectified image 154-$q$, but rather a distinct image generated by apparatus 100 and/or system 140, and/or one or more external elements. For example, in some embodiments, imaging management module 106 may be operative to generate a preliminary composite image 160 in which the region containing the primary feature is not necessarily within dynamic range, and this preliminary composite image 160 may comprise the reference image 155. The embodiments are not limited in this context.

In various embodiments, apparatus 100 and/or system 140 may identify a position of interest 157 within the reference image 155. In some such embodiments, apparatus 100 and/or system 140 may receive a selection of the position of interest 157, and may identify the position of interest 157 based on the received selection. For example, in various embodiments, apparatus 100 and/or system 140 may present reference image 155 on display 142, and receive a selection of position of interest 157 within the reference image 155 via a user interface. In various such example embodiments, a user may use a mouse, joystick, touchpad, keyboard, or other input device to select the position of interest 157 in the reference image 155 via the user interface. In some embodiments, rather than receiving a user selection of position of interest 157, imaging management module 106 may be operative to identify position of interest 157 using one or more algorithms, subroutines, functions, or operations. For example, if captured image 352-5 of FIG. 3A comprises the reference image 155, imaging management module 106 may be operative to employ one or more algorithms to determine that the five-pointed star therein is a primary feature, and may identify position 305 as the position of interest 157 accordingly. The embodiments are not limited in this context.

In various embodiments, imaging management module 106 may be operative to determine a feature window 159 corresponding to the position of interest 157. In some embodiments, determining the feature window 159 may comprise determining a feature window boundary defining the feature window 159. The feature window boundary may define a region within the reference image 155 that contains a primary feature corresponding to the position of interest 157, and the feature window 159 may comprise that region within the reference image 155. In various embodiments, determining the feature window 159 may comprise determining a feature window position 159-1 and a feature window size 159-2. In some embodiments, the feature window position 159-1 may comprise a position at which the center of the feature window 159 resides within the reference image 155. In various embodiments, the feature window position 159-1 may be defined to be the same as the position of interest 157, while in other embodiments, the feature window position 159-1 may be determined based on properties of the primary feature corresponding to the position of interest 157, and may not be the same as the position of interest 157. The embodiments are not limited in this context.

In some embodiments, the feature window size 159-2 may comprise horizontal and vertical dimensions defining a height and width of feature window 159. In various embodiments, the height and/or width of feature window 159 may be defined in pixels. In some embodiments, feature window size 159-2 may comprise a size parameter 159-2-1 that specifies a single value as both the height and the width of the feature window 159. In various such embodiments, feature window 159 may comprise a square region in reference image 155. In some other embodiments, feature window size 159-2 may comprise a width parameter 159-2-2 that specifies the width of the feature window 159 and a height parameter 159-2-3 that specifies the height of the feature window 159, and the width of the feature window 159 may not be equal to the height of the feature window 159. The embodiments are not limited in this context.

Returning to FIG. 1, in various embodiments, once the feature window 159 in reference image 155 has been determined, imaging management module 106 may be operative to determine one or more optimal displacement factors 158-$s$ for a captured image array 152 or rectified image array 154 corresponding to the reference image 155, based on the feature window 159. In some embodiments, imaging management module 106 may be operative to determine the one or more optimal displacement factors 158-$s$ according to a second iterative process. In each iteration of the second iterative process, one or more candidate displacement factors 158-$s$ may be evaluated. In a first iteration of the second iterative process, the values of one or more candidate displacement factors 158-$s$ may be determined according to one or more minimum displacement factors. For example, in a first iteration, a candidate displacement factor 158-$s$ comprising a value of zero may be evaluated. In each subsequent iteration, the one or more candidate displacement factors 158-$s$ may be incremented, and the incremented values may be evaluated. In various embodiments, the one or more candidate displacement factors 158-$s$ may comprise integer numbers of pixels. In some embodiments, in each iteration, the one or more candidate displacement factors 158-$s$ may be incremented by integer numbers of pixels. In various such embodiments, the one or more candidate displacement factors 158-$s$ may be incremented by one pixel in each iteration. In the particular example of an initial iteration in which a candidate displacement factor 158-$s$ comprising a value of zero is evaluated, in a second iteration, the candidate displacement factor 158-$s$ may be incremented to a value of one, and the incremented candidate displacement factor 158-$s$ comprising that value of one may be evaluated. In some other embodiments, sub-integer numbers of pixels may be used in conjunction with one or more pixel interpolation techniques. The embodiments are not limited in this context.

In various embodiments, the one or more optimal displacement factors 158-$s$ may comprise displacement factors 158-$s$ that, when applied to rectified image array 154, result in the generation of a composite image 160 comprising an HDR region 161 exhibiting a maximized level of focus and/or sharpness. For a given set of candidate displacement factors 158-$s$, the one or more displacement factors 158-$s$ corresponding to an HDR region exhibiting a maximized level of focus and/or sharpness may comprise the one or more displacement factors among that set of candidate displacement factors 158-$s$ that result in a maximum level of focus and/or sharpness with respect to all the candidate displacement factors 158-$s$ in the set. In some embodiments, the evaluation of the one or more candidate displacement factors 158-$s$ in each iteration of the second iterative process may comprise determining a level of focus and/or sharpness for an HDR region 161 of a prospective composite image 160 generated according to those one or more candidate displacement factors 158-$s$. In various embodiments, performing this determination may not require actual generation of the entire prospective composite image 160, and instead may comprise generating only the portion of the prospective composite image 160 that resides within the focus region 161. In some embodiments, the focus region 161 for a prospective composite image 160 may be defined by an HDR region boundary that defines what the location of the focus region 161 would be within the prospective composite image 160 if the prospective composite image 160 were actually generated. The process of generating the portion of a prospective composite image 160 that resides within its focus region 161 may be referred to as "generating the focus region 161," and this term shall be employed hereinafter. The embodiments are not limited in this context.

In various embodiments, the focus region 161 may be defined by an HDR region boundary that corresponds to the feature window boundary defining feature window 159 in reference image 155. More particularly, in some embodiments, the focus region 161 may comprise the positions and/or pixels within composite image 160 that correspond to the positions and/or pixels within the feature window 159 in reference image 155. In various embodiments, the focus region boundary may be determined based on the feature window boundary. In embodiments in which reference image 155 comprises a captured image 152-$p$ within captured image array 152 or a rectified image 154-$q$ within rectified image array 154, a region within each other captured or rectified image that comprises the positions and/or pixels corresponding to those within the feature window 159 according to one or more displacement factors 158-$s$ may be referred to as a projected feature window 163-$t$. In some such embodiments, for any one or more particular displacement factors 158-$s$, the focus region 161 in composite image 160 may be said to correspond to the projected feature windows 163-$t$ defined within the various captured images 152-$p$ and/or rectified images 154-$q$ by those one or more particular displacement factors 158-$s$. As such, given one or more candidate displacement factors 158-$s$ and a feature window 159 in reference image 155, a set of projected feature windows 163-$t$ may be determined that corresponds to the focus region 161 in composite image 160 and to the feature window 159 in reference image 155. The embodiments are not limited in this context.

In various embodiments, generating the focus region 161 corresponding to one or more candidate displacement factors 158-$s$ may comprise determining the projected feature windows 163-$t$ defined by the one or more candidate displacement factors 158-$s$ and averaging the pixel intensity values of the pixels within those projected feature windows 163-$t$ and the feature window 159 in reference image 155. In some embodiments, once the focus region 161 corresponding to one or more candidate displacement factors 158-$s$ has been generated, a level of focus may be determined for that focus region 161. In various embodiments, the level of focus may comprise a measure of sharpness. In some embodiments, such a measure of sharpness may be calculated as the squared norm of the spatial gradient of the focus region 161. In various embodiments, in each iteration of the second iterative process, the focus region 161 corresponding to the one or more candidate displacement factors 158-$s$ to be evaluated may be generated, and a measurement of sharpness or other level of focus may be calculated for that focus region 161. In some embodiments, the second iterative process may continue until the one or more candidate displacement factors 158-$s$ reach one or more displacement factor limits 180-$v$. In various embodiments, each of the one or more displacement factor limits 180-$v$ may comprise a maximum candidate value for a corresponding one of the one or more candidate displacement factors 158-$s$. In some embodiments, the one or more candidate displacement factors 158-$s$ that result in the generation of an HDR region 161 exhibiting a maximized sharpness or other level of focus may be identified as the one or more optimal displacement factors 158-$s$. The embodiments are not limited in this context.

Returning to FIG. 1, in various embodiments, once the one or more optimal displacement factors 158-$s$ have been determined, imaging management module 106 may be operative to transform captured image array 152 and/or rectified image array 154 according to the one or more optimal displacement factors 158-$s$. In some such embodiments, reference image 155 may comprise a rectified image 154-$q$ within rectified image array 154, and imaging management module 106 may be operative to transform each other rectified image 154-$q$ within rectified image array 154 according to the one or more optimal displacement factors 158-$s$. In various such embodiments, for each other rectified image 154-*q* in rectified image array 154, imaging management module 106 may be operative to determine one or more relative displacements 156-*q*-*r* based on the one or more optimal displacement factors 158-*s* and the relative positions of those rectified images 154-*q* in rectified image array 154 with respect to reference image 155. In some embodiments, for each other rectified image 154-*q*, the one or more relative displacements 156-*q*-*r* may comprise a horizontal displacement 156-*q*-1 and a vertical displacement 156-*q*-2. In various embodiments, imaging management module 106 may be operative to transform each other rectified image 154-*q* in the horizontal direction by horizontally transforming each of its pixels by the horizontal displacement 156-*q*-1, and may be operative to transform each other rectified image 154-*q* in the vertical direction by vertically transforming each of its pixels by the vertical displacement 156-*q*-2. The embodiments are not limited in this context.

In some embodiments, once captured image array 152 and/or rectified image array 154 has been transformed according to the one or more optimal displacement factors 158-*s*, imaging management module 106 may be operative to generate composite image 160 based on the transformed captured image array 152 and/or the transformed rectified image array 154. For example, in embodiments in which imaging management module 106 is operative to transform the rectified images 154-*q* within rectified image array 154 according to the one or more optimal displacement factors 158-*s*, imaging management module 106 may be operative to generate composite image 160 by averaging the pixel intensity values of the pixels in reference image 155 and the other rectified images 154-*q* in rectified image array. The embodiments are not limited in this context.

In various embodiments, the aforementioned techniques for generating a composite image 160 in which an HDR region 161 is within dynamic range may be applied to a series of captured image arrays 152 and/or rectified image arrays 154 to generate a video 162 comprising a series of frames comprising composite images 160, the focus region 161 in each one of which is within dynamic range. For example, in some embodiments, camera array 150 may be used to capture a series of captured image arrays 152 comprising captured images 152-*p* of a scene in which an object in motion comprises the primary feature. Assuming that the camera array 150 is stationary, for each camera 150-*n* in camera array 150, the positions of the moving object in the captured images 152-*p* will vary from captured image array 152 to captured image array 152. Accordingly, the positions of the moving object in the rectified images 154-*q* generated based on the captured images 152-*p* will vary from rectified image array 154 to rectified image array 154. As such, if the feature corresponds to the moving object, the location of the feature window 159 may be expected to vary from reference image 155 to reference image 155 in the series of references images 155 corresponding to the series of captured image arrays 152 and/or the series of rectified image arrays 154.

In various embodiments, in order to account for the motion of the feature window 159 in the series of reference images 155, imaging management module 106 may be operative to utilize a motion tracking algorithm to track the motion of the feature window 159 from reference image 155 to reference image 155. Examples of algorithms that may be employed include an optical flow algorithm, a mean-shift based tracking algorithm, and an OpenTLD algorithm, although the embodiments are not limited to these examples. In some embodiments, when a captured image array 152 or a rectified image array 154 is received and/or generated, imaging management module 106 may utilize the motion tracking algorithm to identify the location of the feature window 159 in the reference image 155 corresponding to that captured image array 152 or rectified image array 154. In various such embodiments, imaging management module 106 may be operative to utilize the motion tracking algorithm to identify the location of the feature window 159 in the reference image 155 based on the location of the feature window in a preceding reference image 155, or on the locations of the feature windows in a plurality of preceding reference images 155. The embodiments are not limited in this context.

In some embodiments, when the position of a feature window 159 for a reference image 155 is determined using such a motion tracking algorithm, one or more displacement factors 158-*s* generated based on that reference image 155 may exhibit errors corresponding to the use of the motion tracking algorithm. In turn, frames comprising composite images 160 generated based on those one or more displacement factors 158-*s* may comprise visual artifacts caused by errors in those one or more displacement factors 158-*s*. In order to reduce or eliminate the occurrence of such artifacts, in various embodiments, the one or more displacement factors 158-*s* determined based on the series of reference images 155 may be smoothed. In some such embodiments, this smoothing may be accomplished by filtering the one or more displacement factors 158-*s*. In an example embodiment, the one or more displacement factors 158-*s* determined based on the series of reference images 155 may be smoothed using a Kalman filter. In various embodiments, a Kalman filter may also be applied to the motion tracking output to minimize visual artifacts in the refocused video. The embodiments are not limited in this context.

Figure 6:
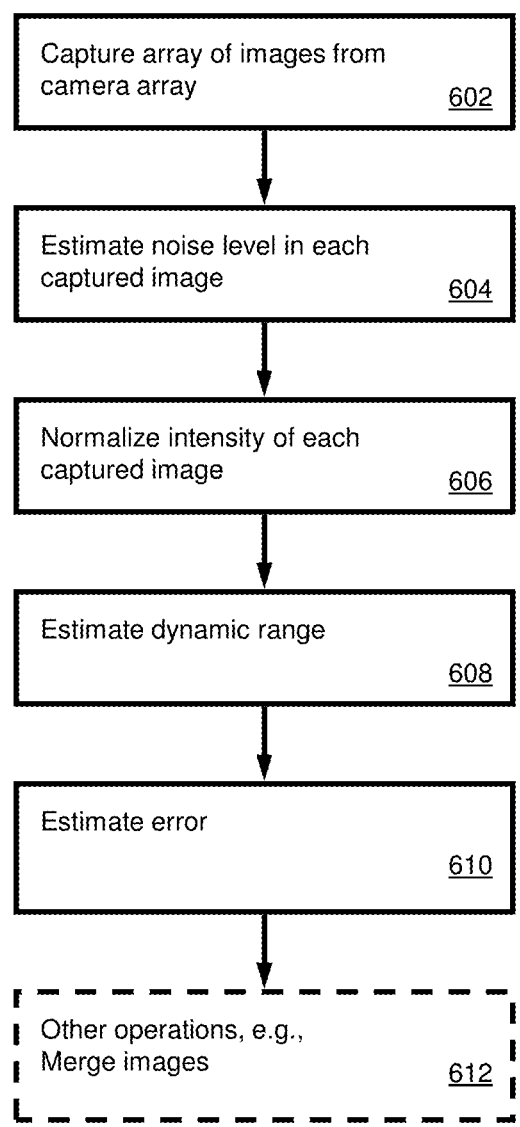
FIG. 6 illustrates one embodiment of a first logic flow.

FIG. 6 illustrates a logic flow 600 in accordance with an embodiment of the present disclosure. In contrast to known solutions for disparity estimation, which often assume a stereo pair of cameras, logic flow 600 is applicable to a camera array 150 of arbitrary size or arrangement. Further, in contrast to known solutions that assume that a scene is imaged identically by all cameras 150-*n* in the array 150, logic flow 600 targets exposure-varying imagery or portions of imagery from camera array 150 for HDR applications. Logic flow 600 is non-iterative and computationally efficient.

Logic flow 600 includes at least two advantages compared to the known art. First, in contrast to traditional stereo imaging processes, logic flow 600 avoids usage of a reference image patch in an error computation, and consequently avoids problems of the known art when a reference image patch is saturated. Second, logic flow 600 utilizes a noise model for the input images in the HDR estimation and error-computation stages, such that the noise model accounts for noise variations in exposure-varying sequences.

Logic flow 600 operates generally by normalizing the different input images from camera array 150 based on their corresponding values of exposure parameters. Next, at each pixel, the logic flow estimates an HDR image patch for each candidate disparity using all the input image patches. Finally, the logic flow estimates a disparity at each patch as a candidate disparity that minimizes an error between the HDR image patch and all the image patches from the array (appropriately shifted using the candidate disparity). The logic flow is applicable to both raw Bayer data from the sensor (that is linearly proportional to the incident intensity on the sensor within the limits of saturation) and images at the output of an imaging pipeline (typically includes demosaicking, color correction, white balancing, gamma conversion, and so forth). If raw Bayer data is available, then the quality of disparity estimation is often better. However, raw Bayer data often is not provided by certain mobile devices, e.g., mobile phones or tablets. For such devices, embodiments use RGB data produced by the mobile devices.

Logic flow 600 begins at block 602, at which images are captured from cameras 150-$k$ within camera array 150. The values of exposure parameters used by cameras 150-$k$ are not all the same. In particular, values of exposure parameters may be selected such that each of cameras 150-$k$ may capture an image without undersaturation or oversaturation within a predetermined intensity range of a high-dynamic range image.

Next, at block 604, logic flow 600 estimates the noise present in each captured image. An estimation of the noise level is used in further processing. The amount of noise in each captured image depends upon the values of exposure parameters used to capture the image. Digital camera sensors suffer from different noise sources such as dark current, photon shot noise, readout noise and noise from an analog to digital conversion ("ADC").

Raw RGB image data from a CCD image sensor may be referred to as Bayer data. The noise model used herein for raw Bayer data includes an exposure parameter representing ISO gain applied to the sensor. Images may be captured from the CCD image sensor by varying an exposure parameter such as either the exposure time or the ISO gain. At least some manufacturers of CCD image sensors provide an ability to vary ISO gain. Varying the ISO gain is often a useful way to vary an exposure parameter when it is not feasible to increase exposure times due to blurring caused by either motion in the image or unsteadiness of a hand-held camera. Let $I_j$ denote the number of electrons generated at a pixel site j on the sensor per unit time, which is proportional to the incident spectral irradiance, resulting $I_j \cdot t$ in electrons generated over an exposure time t. Embodiments model the pixel value as a normal random variable $X_j$ in accordance with Equations (1)-(4):

$$X_j = (S_j + R)\alpha g + Q \quad (1)$$

$$S_j \sim N(I_j t + \mu_{DC}, I_j t + \mu_{DC}) \quad (2)$$

$$R \sim N(\mu_R, \sigma^2_R) \quad (3)$$

$$Q \sim N(\mu_Q, \sigma^2_Q) \quad (4)$$

In Eq. (3) and (4), $N(\mu, \sigma^2)$ represents the normal distribution with mean $\mu$ and variance $\sigma^2$. $S_j$ is a random variable denoting the number of electrons collected at pixel site j. $S_j$ typically is modeled using a Poisson distribution whose mean is determined by the number of electrons generated and the dark current $\mu_{DC}$. The Poisson distribution may be modeled using a normal distribution, which is reasonable for a large number of electrons. The model does not take into account any dependence of dark current on exposure time and temperature, and the model assumes a constant value estimated using typical exposure times for outdoor photography. "R" denotes readout noise and "Q" denotes noise from ADC, both of which are modeled as Gaussian random variables. Variable "g" denotes the ISO gain applied to the sensor and "a" denotes the combined gain of the camera circuitry and the analog amplifier in units of digital number per electron. The noise model does not model pixel response non-uniformity in the sensor.

Next, at block 606, the intensity of each image captured from block 602 may be normalized. Intensity normalization for raw Bayer data may be achieved using the noise model previously described with respect to block 604. The j-th exposure-normalized image, denoted $y_j(k)$ may be computed in accordance with Equation (5):

$$y_j(k) = \frac{x_j(k) - \hat{\alpha}g(k)[\hat{\mu}_{DC} + \hat{\mu}_R] - \hat{\mu}_Q}{\hat{\alpha}g(k)t(k)} \quad (5)$$

A camera processing pipeline is known as a set of calculations applied to raw Bayer data captured from a sensor in order to generate an 8-bit RGB image that can be viewed, saved, or otherwise processed. Typical camera pipeline algorithms include de-mosaicing, white balancing, color compensation, gamma correction, and so forth. When image data is obtained after a camera processing pipeline has been applied to the raw data, the linear normalization of Eq. (5) is no longer valid. However, color histogram matching may be an effective technique for normalizing image data captured with different response and color characteristics. Therefore, embodiments match a histogram of every image in the array to the camera with median exposure level to compute the normalized images. To avoid information loss in images from other cameras in areas where the image with the median exposure suffers from saturation, embodiments of block 606 normalize images by computing histogram-matched images by use of floating point precision. Histogram matching is performed independently on each color channel (e.g., red, green and blue) of the color images.

Next, at block 608, a dynamic range is estimated. In particular, block 608 first denotes one of the camera views in the array as the reference view. Then an HDR scene is estimated for the reference view. Next, for each view, logic flow 600 examines each pixel location in order to identify candidate disparities. Candidate disparities may be determined based on the resolution of the cameras, physical spacing between the cameras and depth range of interest. Block 608 then estimates an HDR image patch at each candidate disparity using all the images from the camera array.

Block 608 analyzes disparities by considering a set of L candidate disparities in order to find the shortest baseline pair of cameras. Baseline refers to the physical separation between a pair of cameras. The shortest baseline pair refers to the pair of cameras that have minimum physical separation. The disparity between every camera in the array and the reference view may be computed for each candidate disparity. The normalized image patches are then shifted by the appropriate disparity to generate shifted image patches $z^l(k)$.

In contrast to the known art of estimating the HDR image, which implicitly assumes that the images are well-aligned, embodiments described herein do not assume that images are well-aligned for the purpose of disparity estimation. Instead, logic flow 600 estimates the HDR image as a weighted sum of the shifted patches. Weights for the weighted sum are determined using the midpoint of the intensity scale ($I_{mid}$) for all pixel locations, as shown below in Equations (6)-(7):

$$w(k) = \frac{\hat{\alpha}^2 g(k)^2 t(k)^2}{\hat{\alpha}^2 g(k)^2 t(k) I_{mid} + \hat{\alpha}^2 g(k)^2 [\mu_{DC} + \hat{\sigma}^2_R] + \hat{\sigma}^2_Q} \quad (6)$$

Logic flow 600 estimates $I_{mid}$ by use of Equation (7), in which $P_{max}$ corresponds to the maximum pixel value over the whole scene:

$$I_{mid} = \sqrt{\frac{P_{max} - \hat{\alpha} g_{min}(k)[\hat{\mu}_{DC} + \hat{\mu}_R] - \hat{\mu}_Q}{\hat{\alpha} g_{min}(k) t_{min(k)}}} \quad (7)$$

For conventional images at the output of a camera processing pipeline, the noise model is no longer valid because the data including noise has been processed through the camera processing pipeline, which alters its properties. Conventional approaches to HDR estimation attempt to estimate the camera response curve from the input images, which can be computationally expensive to do at each candidate disparity. However, when the images come from a known camera and processing pipeline, the camera response curve can be estimated offline and utilized in block 608. When the camera response curve is not available, embodiments described herein use weights that are proportional to the exposure levels of the different images in order to provide satisfactory results. Embodiments detect saturated pixels using a threshold criterion and the other operations block 612 avoids usage of saturated pixels by setting their corresponding weights to zero.

Next, at block 610, an error is estimated by use of an objective function. The objective function computes a weighted sum of absolute differences ("SAD") between the estimated HDR image patch and each image from the camera array 150. The disparity at each pixel location is then estimated as the one that minimizes the objective function. Note that the error computation utilizes the estimated HDR image for the reference view and not the actual reference camera view directly, hence avoiding problems that may arise if the view from the reference camera suffers from saturation. Some embodiments, the objective function is computed over a window size of nine pixels.

Next, at optional block 612, other operations may be performed. For example, elements from the images may be combined to produce a composite image having a high dynamic range, yet still have relatively high resolution sufficient to render visible detail within both light regions and dark regions.

Filtering is often used in disparity computation to eliminate false matches. Disparity estimation with images that have different exposures is a challenging problem and may result in more false matches. Tests showed that conventional filtering criteria used in stereo applications are not successful in eliminating many of the false matches and more aggressive filtering may be necessary for conventional methods. In contrast, embodiments described herein have identified two minima of the objective function and are able to filter out matches where the two minima differ by less than a predetermined threshold criterion.

Figure 7:
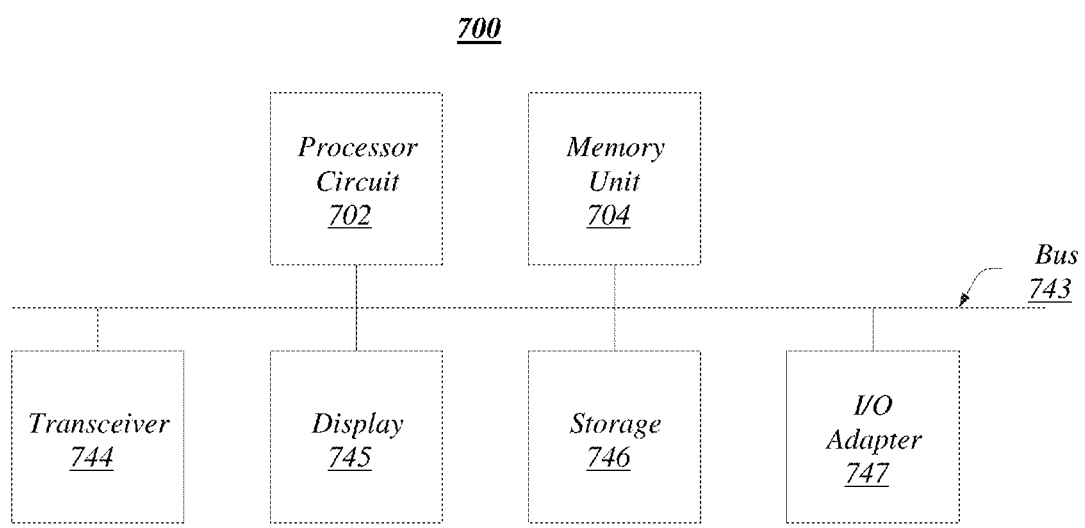
FIG. 7 illustrates one embodiment of a second system.

FIG. 7 illustrates one embodiment of a system 700. In various embodiments, system 700 may be representative of a system or architecture suitable for use with one or more embodiments described herein, such as apparatus 100 and/or system 140 of FIG. 1 and/or logic flow 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In various embodiments, system 700 may include a processor circuit 702. Processor circuit 702 may be implemented using any processor or logic device, and may be the same as or similar to processor circuit 102 of FIG. 1.

In one embodiment, system 700 may include a memory unit 704 to couple to processor circuit 702. Memory unit 704 may be coupled to processor circuit 702 via communications bus 743, or by a dedicated communications bus between processor circuit 702 and memory unit 704, as desired for a given implementation. Memory unit 704 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 700 may include a transceiver 744. Transceiver 744 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 744 may operate in accordance with one or more applicable standards in any version. The embodiments are not limited in this context.

In various embodiments, system 700 may include a display 745. Display 745 may constitute any display device capable of displaying information received from processor circuit 702, and may be the same as or similar to display 142 of FIG. 1.

In various embodiments, system 700 may include storage 746. Storage 746 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may include technology to increase the storage performance enhanced protection for valuable digital media when multiple hard drives are included, for example. Further examples of storage 746 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 700 may include one or more I/O adapters 747. Examples of I/O adapters 747 may include Universal Serial Bus (USB) ports/adapters, IEEE 1394 Firewire ports/adapters, and so forth. The embodiments are not limited in this context.

Figure 8:
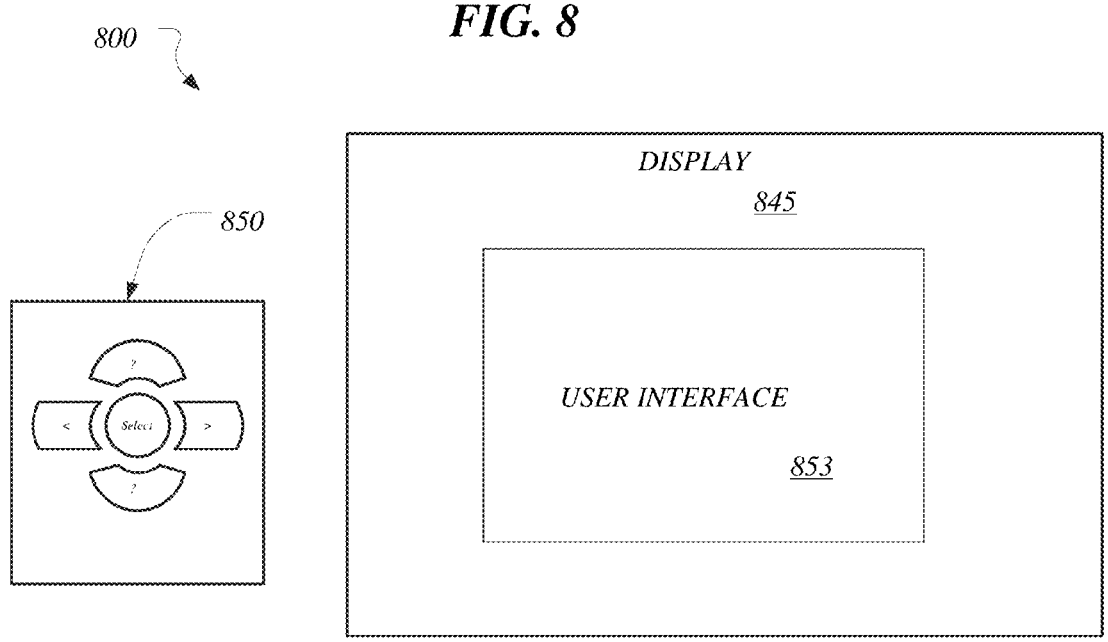
FIG. 8 illustrates one embodiment of a third system.
Figure 8:
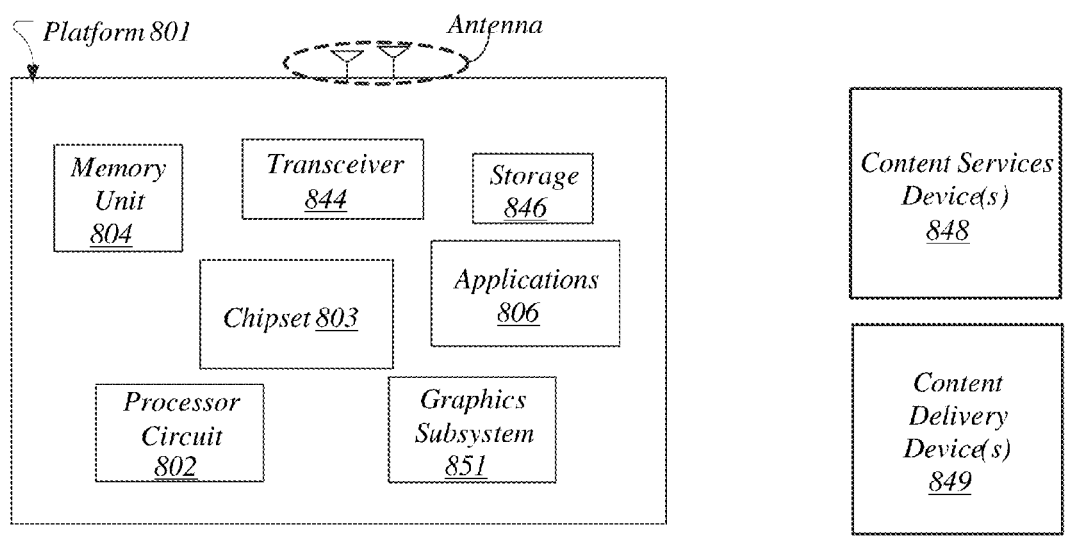
Figure 8:
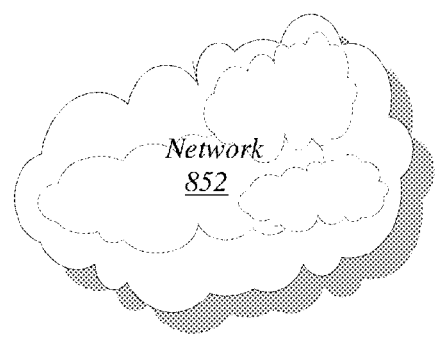

FIG. 8 illustrates an embodiment of a system 800. In various embodiments, system 800 may be representative of a system or architecture suitable for use with one or more embodiments described herein, such as apparatus 100 and/or system 140 of FIG. 1, logic flow 600 of FIG. 6, and/or system 700 of FIG. 7. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In embodiments, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 800 includes a platform 801 coupled to a display 845. Platform 801 may receive content from a content device such as content services device(s) 848 or content delivery device(s) 849 or other similar content sources. A navigation controller 850 including one or more navigation features may be used to interact with, for example, platform 801 and/or display 845. Each of these components is described in more detail below.

In embodiments, platform 801 may include any combination of a processor circuit 802, chipset 803, memory unit 804, transceiver 844, storage 846, applications 806, and/or graphics subsystem 851. Chipset 803 may provide intercommunication among processor circuit 802, memory unit 804, transceiver 844, storage 846, applications 806, and/or graphics subsystem 851. For example, chipset 803 may include a storage adapter (not depicted) capable of providing intercommunication with storage 846.

Processor circuit 802 may be implemented using any processor or logic device, and may be the same as or similar to processor circuit 702 in FIG. 7.

Memory unit 804 may be implemented using any machine-readable or computer-readable media capable of storing data, and may be the same as or similar to memory unit 704 in FIG. 7.

Transceiver 844 may include one or more radios capable of transmitting and receiving signals using various suitable wireless communications techniques, and may be the same as or similar to transceiver 744 in FIG. 7.

Display 845 may include any television type monitor or display, and may be the same as or similar to display 745 in FIG. 7.

Storage 846 may be implemented as a non-volatile storage device, and may be the same as or similar to storage 746 in FIG. 7.

Graphics subsystem 851 may perform processing of images such as still or video for display. Graphics subsystem 851 may be a graphics processing unit (GPU) or a visual processing unit (VPU), for example. An analog or digital interface may be used to communicatively couple graphics subsystem 851 and display 845. For example, the interface may be any of a High-Definition Multimedia Interface, DisplayPort, wireless HDMI, and/or wireless HD compliant techniques. Graphics subsystem 851 could be integrated into processor circuit 802 or chipset 803. Graphics subsystem 851 could be a stand-alone card communicatively coupled to chipset 803.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 848 may be hosted by any national, international and/or independent service and thus accessible to platform 801 via the Internet, for example. Content services device(s) 848 may be coupled to platform 801 and/or to display 845. Platform 801 and/or content services device(s) 848 may be coupled to a network 852 to communicate (e.g., send and/or receive) media information to and from network 852. Content delivery device(s) 849 also may be coupled to platform 801 and/or to display 845.

In embodiments, content services device(s) 848 may include a cable television box, personal computer, network, telephone, Internet enabled devices or appliance capable of delivering digital information and/or content, and any other similar device capable of unidirectionally or bidirectionally communicating content between content providers and platform 801 and/display 845, via network 852 or directly. It will be appreciated that the content may be communicated unidirectionally and/or bidirectionally to and from any one of the components in system 800 and a content provider via network 852. Examples of content may include any media information including, for example, video, music, medical and gaming information, and so forth.

Content services device(s) 848 receives content such as cable television programming including media information, digital information, and/or other content. Examples of content providers may include any cable or satellite television or radio or Internet content providers. The provided examples are not meant to limit the various embodiments.

In embodiments, platform 801 may receive control signals from navigation controller 850 having one or more navigation features. The navigation features of navigation controller 850 may be used to interact with a user interface 853, for example. In embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be echoed on a display (e.g., display 845) by movements of a pointer, cursor, focus ring, or other visual indicators displayed on the display. For example, under the control of software applications 806, the navigation features located on navigation controller 850 may be mapped to virtual navigation features displayed on user interface 853. In embodiments, navigation controller 850 may not be a separate component but integrated into platform 801 and/or display 845. Embodiments, however, are not limited to the elements or in the context shown or described herein.

In embodiments, drivers (not shown) may include technology to enable users to instantly turn on and off platform 801 like a television with the touch of a button after initial boot-up, when enabled, for example. Program logic may allow platform 801 to stream content to media adaptors or other content services device(s) 848 or content delivery device(s) 849 when the platform is turned "off." In addition, chip set 803 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 800 may be integrated. For example, platform 801 and content services device(s) 848 may be integrated, or platform 801 and content delivery device(s) 849 may be integrated, or platform 801, content services device(s) 848, and content delivery device(s) 849 may be integrated, for example. In various embodiments, platform 801 and display 845 may be an integrated unit. Display 845 and content service device(s) 848 may be integrated, or display 845 and content delivery device(s) 849 may be integrated, for example. These examples are not meant to limit the embodiments.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 801 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
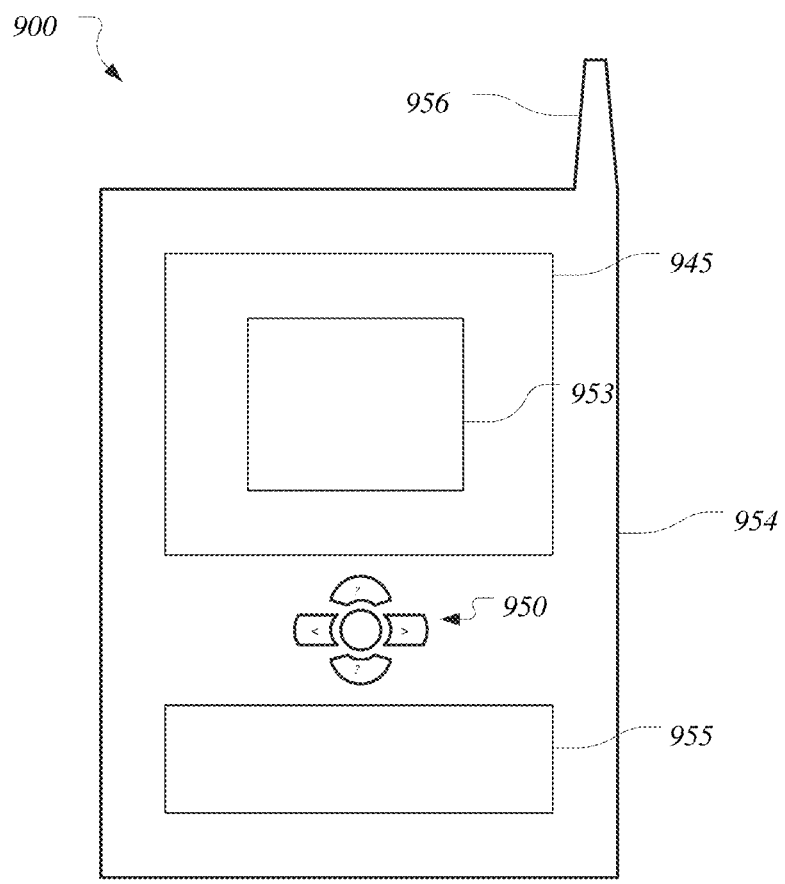
FIG. 9 illustrates one embodiment of a device.

As described above, system 800 may be embodied in varying physical styles or form factors. FIG. 9 illustrates embodiments of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a display 945, a navigation controller 950, a user interface 953, a housing 954, an I/O device 955, and an antenna 956. Display 945 may include any suitable display unit for displaying information appropriate for a mobile computing device, and may be the same as or similar to display 845 in FIG. 8. Navigation controller 950 may include one or more navigation features which may be used to interact with user interface 953, and may be the same as or similar to navigation controller 850 in FIG. 8. I/O device 955 may include any suitable I/O device for entering information into a mobile computing device. Examples for I/O device 955 may include an alphanumeric keyboard, a numeric keypad, a touch pad, input keys, buttons, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

At least one machine-readable medium may comprise a plurality of instructions that, in response to being executed on a computing device, may cause the computing device to receive an array of images from a camera array, the array of images comprising a first image taken with a first value of an exposure parameter and a second image taken with a second value of the exposure parameter, the first value different than the second value, estimate a noise level of each image of the array of images, normalize an intensity of each image based upon the noise level of the respective image, to produce a respective normalized image, identify candidate disparities in each of the respective normalized images, estimate a high dynamic range (HDR) image patch for each candidate disparity, and compute an error from the HDR image patch and an objective function, to produce a disparity estimate.

Such at least one machine-readable medium may comprise instructions that, in response to being executed on the computing device, may cause the computing device to produce a composite image having a higher dynamic range than any one of the array of images, by use of the disparity estimate.

With respect to such at least one machine-readable medium, estimating the noise level may comprise applying ISO gain to a sensor of a camera of the camera array.

With respect to such at least one machine-readable medium, the camera array may comprise one of a single row of cameras and a single column of cameras.

Such at least one machine-readable medium may comprise instructions that, in response to being executed on the computing device, may cause the computing device to designate a reference view as one image of the array of images, to compute a respective disparity between the reference view and each other image of the array of images, to shift the normalized image by its respective disparity, and to calculate a weighted sum of the shifted, normalized images.

With respect to such at least one machine-readable medium, weightings of the shifted, normalized images may be determine using a midpoint of an intensity scale for all pixel locations of the image.

With respect to such at least one machine-readable medium, weightings of the shifted, normalized images may be proportional to exposure levels of a respective image of the array of images.

With respect to such at least one machine-readable medium, an image of the array of images may comprise raw Bayer data from a respective camera.

With respect to such at least one machine-readable medium, an image of the array of images may comprise output data of an imaging pipeline from a respective camera.

Such at least one machine-readable medium may comprise instructions that, in response to being executed on the computing device, may cause the computing device to estimate the HDR image patch comprising usage of a camera response curve.

An apparatus may comprise a processor circuit and an imaging management module for execution on the processor circuit to receive an array of images from a camera array, the array of images comprising a first image taken with a first value of an exposure parameter and a second image taken with a second value of the exposure parameter, the first value different than the second value, to estimate a noise level of each image of the array of images, to normalize an intensity of each image based upon the noise level of the respective image, to produce a respective normalized image, to identify candidate disparities in each of the respective normalized images, to estimate a high dynamic range (HDR) image patch for each candidate disparity, and to compute an error from the HDR image patch and an objective function, to produce a disparity estimate.

With respect to such an apparatus, the imaging management module may produce a composite image having a higher dynamic range than any one of the array of images, by use of the disparity estimate.

With respect to such an apparatus, the imaging management module may estimate the noise level by applying ISO gain to a sensor of a camera of the camera array.

With respect to such an apparatus, the imaging management module may comprise one of a single row of cameras and a single column of cameras.

With respect to such an apparatus, the imaging management module may designate a reference view as one image of the array of images, compute a respective disparity between the reference view and each other image of the array of images, shift the normalized image by its respective disparity, and calculate a weighted sum of the shifted, normalized images.

With respect to such an apparatus, the imaging management module may determine weightings of the shifted, normalized images using a midpoint of an intensity scale for all pixel locations of the image.

With respect to such an apparatus, the imaging management module may determine weightings of the shifted, normalized images proportional to exposure levels of a respective image of the array of images.

With respect to such an apparatus, an image of the array of images comprising raw Bayer data from a respective camera.

With respect to such an apparatus, an image of the array of images comprising output data of an imaging pipeline from a respective camera.

With respect to such an apparatus, the imaging management module may estimate the HDR image patch by usage of a camera response curve.

A method, by a processor circuit, may comprise receiving an array of images from a camera array, the array of images comprising a first image taken with a first value of an exposure parameter and a second image taken with a second value of the exposure parameter, the first value different than the second value, estimating a noise level of each image of the array of images, normalizing an intensity of each image based upon the noise level of the respective image, to produce a respective normalized image, identifying candidate disparities in each of the respective normalized images, estimating a high dynamic range (HDR) image patch for each candidate disparity, and computing an error from the HDR image patch and an objective function, to produce a disparity estimate.

Such a method may comprise producing a composite image having a higher dynamic range than any one of the array of images, by use of the disparity estimate.

Such a method may comprise estimating the noise level comprises applying ISO gain to a sensor of a camera of the camera array.

With respect to such a method, the camera array may comprise one of a single row of cameras and a single column of cameras.

Such a method may comprise designating a reference view as one image of the array of images, computing a respective disparity between the reference view and each other image of the array of images, shifting the normalized image by its respective disparity, and calculating a weighted sum of the shifted, normalized images.

Such a method may comprise determining weightings of the shifted, normalized images using a midpoint of an intensity scale for all pixel locations of the image.

Such a method may comprise determining weightings of the shifted, normalized images proportional to exposure levels of a respective image of the array of images.

With respect to such a method, an image of the array of images may comprise raw Bayer data from a respective camera.

With respect to such a method, an image of the array of images may comprise output data of an imaging pipeline from a respective camera.

Such a method may comprise estimating the HDR image patch by usage of a camera response curve.

A system may comprise a processor circuit, a camera array comprising a plurality of cameras, and an imaging management module for execution on the processor circuit to determine a corresponding sharpness for each of a plurality of candidate displacement factors for an image array comprising a plurality of images corresponding to the plurality of cameras in the camera array, determine an optimal displacement factor comprising a candidate displacement factor corresponding to a maximized sharpness of a focus region for a composite image, and transform the image array based on the optimal displacement factor to align regions of the plurality of images that correspond to the focus region.

A system may comprise a processor circuit, a camera array comprising a plurality of cameras, and an imaging management module for execution on the processor circuit to capture an array of images from the camera array, the array of images comprising a first image taken with a first value of an exposure parameter and a second image taken with a second value of the exposure parameter, the first value different than the second value, to estimate a noise level of each image of the array of images, to normalize an intensity of each image based upon the noise level of the respective image, to produce a respective normalized image, to identify candidate disparities in each of the respective normalized images, to estimate a high dynamic range (HDR) image patch for each candidate disparity, and to compute an error from the HDR image patch and an objective function, to produce a disparity estimate.

With respect to such a system, the imaging management module may produce a composite image having a higher dynamic range than any one of the array of images, by use of the disparity estimate.

With respect to such a system, the imaging management module may estimate the noise level by applying ISO gain to a sensor of a camera of the camera array.

With respect to such a system, the imaging management module may comprise one of a single row of cameras and a single column of cameras.

With respect to such a system, the imaging management module may designate a reference view as one image of the array of images, compute a respective disparity between the reference view and each other image of the array of images, shift the normalized image by its respective disparity, and calculate a weighted sum of the shifted, normalized images.

With respect to such a system, the imaging management module may determine weightings of the shifted, normalized images using a midpoint of an intensity scale for all pixel locations of the image.

With respect to such a system, the imaging management module may determine weightings of the shifted, normalized images proportional to exposure levels of a respective image of the array of images.

With respect to such a system, an image of the array of images comprising raw Bayer data from a respective camera.

With respect to such a system, an image of the array of images comprising output data of an imaging pipeline from a respective camera.

With respect to such a system, the imaging management module may estimate the HDR image patch by usage of a camera response curve.

An apparatus may comprise means for receiving an array of images from a camera array, the array of images comprising a first image taken with a first value of an exposure parameter and a second image taken with a second value of the exposure parameter, the first value different than the second value, means for estimating a noise level of each image of the array of images, means for normalizing an intensity of each image based upon the noise level of the respective image, to produce a respective normalized image, means for identifying candidate disparities in each of the respective normalized images, means for estimating a high dynamic range (HDR) image patch for each candidate disparity, and means for computing an error from the HDR image patch and an objective function, to produce a disparity estimate.

Such an apparatus may comprise means for producing a composite image having a higher dynamic range than any one of the array of images, by use of the disparity estimate.

Such an apparatus may comprise means for estimating the noise level comprises applying ISO gain to a sensor of a camera of the camera array.

With respect to such an apparatus, the camera array may comprise one of a single row of cameras and a single column of cameras.

Such an apparatus may comprise means for designating a reference view as one image of the array of images, means for computing a respective disparity between the reference view and each other image of the array of images, means for shifting the normalized image by its respective disparity, and means for calculating a weighted sum of the shifted, normalized images.

Such an apparatus may comprise means for determining weightings of the shifted, normalized images using a midpoint of an intensity scale for all pixel locations of the image.

Such an apparatus may comprise means for determining weightings of the shifted, normalized images proportional to exposure levels of a respective image of the array of images.

With respect to such an apparatus, an image of the array of images may comprise raw Bayer data from a respective camera.

With respect to such an apparatus, an image of the array of images may comprise output data of an imaging pipeline from a respective camera.

Such an apparatus may comprise means for estimating the HDR image patch by usage of a camera response curve.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable medium comprising a plurality of instructions that, in response to being executed on a computing device, cause the computing device to:

receive an array of images from a camera array, the array of images to comprise a plurality of images including at least a first image taken with a first value of an exposure parameter and a second image taken with a second value of the exposure parameter, the first value different than the second value;

estimate a noise level of each image of the array of images;

generate a plurality of exposure-normalized images, each one of the plurality of exposure-normalized images to be generated by normalizing a respective one of the plurality images based on an exposure parameter value used to capture that one of the plurality of images and a median exposure level for the plurality of images;

identify candidate disparities in each of the plurality of exposure-normalized images;

estimate a high dynamic range (HDR) image patch for each candidate disparity; and compute an error from the HDR image patch and an objective function to produce a disparity estimate.

2. The at least one non-transitory machine-readable medium of claim 1, comprising instructions that, in response to being executed on the computing device, cause the computing device to:
produce a composite image having a higher dynamic range than any one of the array of images, by use of the disparity estimate.

3. The at least one non-transitory machine-readable medium of claim 1, the array of images comprising a first image taken with a first value of ISO gain and a second image taken with a second value of ISO gain.

4. The at least one non-transitory machine-readable medium of claim 1, the camera array comprising one of a single row of cameras and a single column of cameras.

5. The at least one non-transitory machine-readable medium of claim 1, estimating the HDR image patch comprising:
designating a reference view as one image of the array of images;
computing a respective disparity between the reference view and each other image of the array of images;
shifting each exposure-normalized image by its respective disparity; and
calculating a weighted sum of the shifted, exposure-normalized images.

6. The at least one non-transitory machine-readable medium of claim 5, weightings of the shifted, exposure-normalized images determined using a midpoint of an intensity scale for all pixel locations of the image.

7. The at least one non-transitory machine-readable medium of claim 5, weightings of the shifted, exposure-normalized images proportional to exposure levels of a respective image of the array of images.

8. The at least one non-transitory machine-readable medium of claim 1, an image of the array of images comprising raw Bayer data from a respective camera.

9. The at least one non-transitory machine-readable medium of claim 1, an image of the array of images comprising output data of an imaging pipeline from a respective camera.

10. The at least one non-transitory machine-readable medium of claim 1, estimating the HDR image patch comprising usage of a camera response curve.

11. An apparatus to produce a disparity estimate, comprising:
a processor circuit; and
an imaging management module for execution on the processor circuit to:
receive an array of images from a camera array, the array of images to comprise a plurality of images including at least a first image taken with a first value of an exposure parameter and a second image taken with a second value of the exposure parameter, the first value different than the second value;
estimate a noise level of each image of the array of images;
generate a plurality of exposure-normalized images, each one of the plurality of exposure-normalized images to be generated by normalizing a respective one of the plurality images based on an exposure parameter value used to capture that one of the plurality of images and a median exposure level for the plurality of images;
identify candidate disparities in each of the plurality of exposure-normalized images;
estimate a high dynamic range (HDR) image patch for each candidate disparity; and
compute an error from the HDR image patch and an objective function, to produce a disparity estimate.

12. The apparatus of claim 11, the imaging management module to:
produce a composite image having a higher dynamic range than any one of the array of images, by use of the disparity estimate.

13. The apparatus of claim 11, capturing a first image from the camera array with a first value of ISO gain and a second image from the camera array with a second value of ISO gain.

14. The apparatus of claim 11, the camera array comprising one of a single row of cameras and a single column of cameras.

15. The apparatus of claim 11, the imaging management module to:
designate a reference view as one image of the array of images;
compute a respective disparity between the reference view and each other image of the array of images;
shift each exposure-normalized image by its respective disparity; and
calculate a weighted sum of the shifted, exposure-normalized images.

16. The apparatus of claim 15, the imaging management module to determine weightings of the shifted, exposure-normalized images using a midpoint of an intensity scale for all pixel locations of the image.

17. The apparatus of claim 15, the imaging management module to determine weightings of the shifted, exposure-normalized images proportional to exposure levels of a respective image of the array of images.

18. The apparatus of claim 11, an image of the array of images comprising raw Bayer data from a respective camera.

19. The apparatus of claim 11, an image of the array of images comprising output data of an imaging pipeline from a respective camera.

20. The apparatus of claim 11, the imaging management module to estimate the HDR image patch by usage of a camera response curve.

21. A system to produce a disparity estimate, comprising:
a processor circuit;
a camera array comprising a plurality of cameras; and
an imaging management module for execution on the processor circuit to:
capture an array of images from the camera array, the array of images to comprise a plurality of images including at least a first image taken with a first value of an exposure parameter and a second image taken with a second value of the exposure parameter, the first value different than the second value;
estimate a noise level of each image of the array of images;
generate a plurality of exposure-normalized images, each one of the plurality of exposure-normalized images to be generated by normalizing a respective one of the plurality images based on an exposure parameter value used to capture that one of the plurality of images and a median exposure level for the plurality of images;
identify candidate disparities in each of the plurality of exposure-normalized images;
estimate a high dynamic range (HDR) image patch for each candidate disparity; and
compute an error from the HDR image patch and an objective function, to produce a disparity estimate.

22. The system of claim 21, the imaging management module to:
produce a composite image having a higher dynamic range than any one of the array of images, by use of the disparity estimate.

23. The system of claim 21, the array of images comprising a first image taken with a first value of ISO gain and a second image taken with a second value of ISO gain.

24. The system of claim 21, the camera array comprising one of a single row of cameras and a single column of cameras.

25. The system of claim 21, the imaging management module to:
designate a reference view as one image of the array of images;
compute a respective disparity between the reference view and each other image of the array of images;
shift each exposure-normalized image by its respective disparity; and
calculate a weighted sum of the shifted, exposure-normalized images.

26. The system of claim 25, the imaging management module to determine weightings of the shifted, exposure-normalized images using a midpoint of an intensity scale for all pixel locations of the image.

27. The system of claim 25, the imaging management module to determine weightings of the shifted, exposure-normalized images proportional to exposure levels of a respective image of the array of images.

28. The system of claim 21, an image of the array of images comprising raw Bayer data from a respective camera.

29. The system of claim 21, an image of the array of images comprising output data of an imaging pipeline from a respective camera.

30. The system of claim 21, the imaging management module to estimate the HDR image patch by usage of a camera response curve.

* * * * *